UNITED STATES PATENT OFFICE.

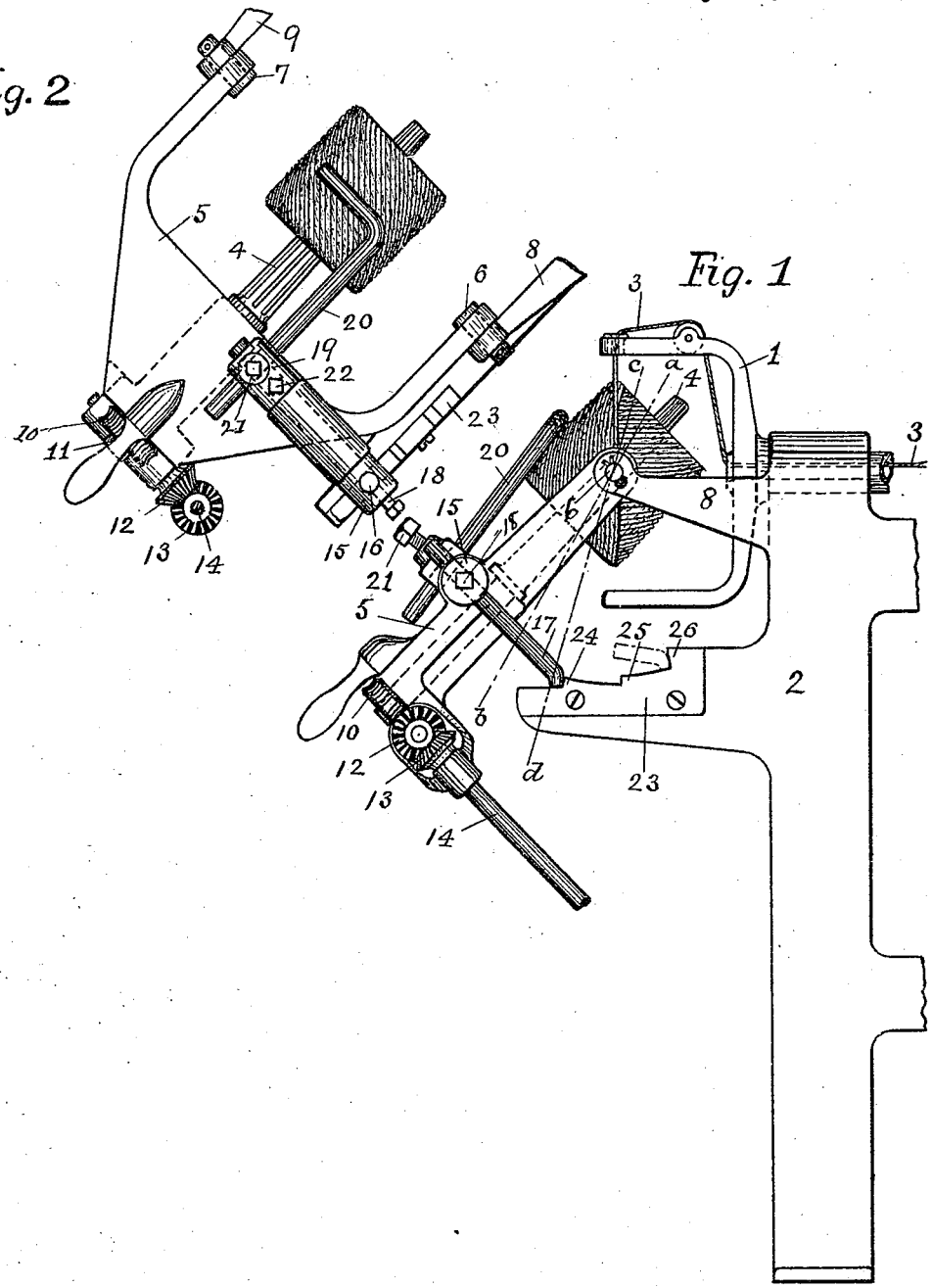

PETER HETZEL, OF BROOKLYN, ASSIGNOR TO JAMES M. WATERBURY AND CHAUNCEY MARSHALL, OF NEW YORK, N. Y.

TWINE-BALL-GAGING DEVICE.

SPECIFICATION forming part of Letters Patent No. 501,186, dated July 11, 1893.

Application filed August 22, 1892. Serial No. 443,791. (No model.)

*To all whom it may concern:*

Be it known that I, PETER HETZEL, a citizen of the United States, residing at Brooklyn, in the county of Kings and State of New York, have invented certain new and useful Improvements in Twine-Ball-Gaging Devices, of which the following is a full, clear, and exact specification.

This invention pertains to the machinery used in balling twine or yarn, in which the twine is wound upon a slowly rotating spindle by a rapidly revolving flier. The axis of the ball spindle and of the flier are located in the same vertical plane, but are inclined to each other in that plane, the degree of inclination governing the contour of the ball wound thereon. In order to wind a ball of the usual form it is necessary to alter the degree of inclination at a particular time while the ball is being wound, the last layers being wound on more nearly parallel with the axis of the ball spindle in order to cover the ends and give the ball a finished appearance. When the machine attendant is relied upon to change the inclination of the spindle, a considerable variation is found to exist in the size, weight, or contour of the resulting balls, due to the difficulty of determining the exact time for making the change from one position to another.

The object of this invention is to provide means for automatically altering the inclination of the ball spindle in order that the balls shall all be built up uniformly in size and in weight, and have the desired contour.

Figure 1 of the drawings represents a side view of my improved devices, shown in connection with a sufficient portion of the machine to illustrate its working. Fig. 2 is a projection at forty-five degrees of the parts shown in Fig. 1.

The revolving flier, 1, is journaled in the frame 2, and the twine, 3, passes through a hole in the center of the flier spindle, thence through an eye in the end of one of the flier arms, by which the twine is guided in a constant plane as the flier revolves. The twine is thus wound upon a ball spindle, 4, which is journaled in a head, 5. That head is suspended by the pins, 6 and 7, from the extensions 8 and 9 of the main frame 2, and the centers of suspension are located in a line transverse to the axes of the spindle 4 and flier 1, that line passing through the point of intersection of those axes. The spindle 4 is slowly rotated by means of the worm wheel 10, worm 11, bevel gears 12 and 13, and shaft 14. The shaft 14 is connected with the driving spindle of the machine by connections which allow of the oscillation of the head 5 upon the pins 6 and 7; but those connections form no part of the present invention and are not herein shown.

The shaft 15 is journaled in the head 5 and has at one end the transverse hole 16 in which the detent 17 is secured by the set screw 18. The opposite end of the shaft 15 is provided with a collar 19, through which passes the gage lever 20, secured in the collar by the set screw 21. The set screw 22 serves to secure the collar on the shaft with the detent 17 and the lever 20 at any desired angle to each other. The detent 17 abuts against a gage plate 23 which is secured to the main frame 2 by screws, and which is provided with steps against which the detent 17 rests to support the head 5 in its different positions.

The mode of operation of the devices is as follows: The twine is wound upon the spindle 4 as shown in Fig. 1 until the ball, upon reaching the size for which the gage is set, lifts the gage lever 20 thus lifting the detent 17 above the step 24. Being thus released the head drops by gravity until the detent comes against the step 25. In this position the axis of the spindle 4 is at $a$—$b$. The twine continues winding upon the ball until it again raises the gage lever and detent, falling to the step 26; in which position the axis of the spindle is at $c$—$d$, and the ball receives the finishing layer of twine. For some requirements it may be found that two steps on the gage plate are sufficient. That plate may be removed and others substituted by taking out the two screws which secure it to the frame. The gage lever 20 and the detent 17 may also be adjusted to suit any requirement as to size of ball. Springs or weights may be added to the detent 17 or lever 20 and to the head 5 when it is required to use them in a position where their own weight will not serve to actuate them.

I claim as my invention—

1. A twine ball gaging device consisting of a supporting head for the ball spindle, a gaging lever and detent rigidly connected together, and a gage plate provided with steps which are adapted to engage with that detent and support the ball spindle head in its desired positions; all substantially as described.

2. The combination of the swinging spindle head 5, the stepped plate 23, the detent 17, and the lever 20, the detent being adjustable to vary the angle of the ball spindle, and the lever being adjustable to vary the size of ball at the releasing times; all substantially as described.

PETER HETZEL.

Witnesses:
JOHN G. WOOD,
LOUIS A. EISEMANN.